(12) United States Patent
Park

(10) Patent No.: US 12,409,532 B2
(45) Date of Patent: Sep. 9, 2025

(54) COUPLING DEVICE FOR REPLACEMENT OF GEAR BOX OF ELECTRIC TORQUE WRENCH

(71) Applicant: BOLTING MASTER, Suncheon-si (KR)

(72) Inventor: Keum Joon Park, Suncheon-si (KR)

(73) Assignee: BOLTING MASTER, Suncheon-si (KR)

( * ) Notice: Subject to any disclaimer, the term of this patent is extended or adjusted under 35 U.S.C. 154(b) by 0 days.

(21) Appl. No.: 18/009,744

(22) PCT Filed: Dec. 14, 2021

(86) PCT No.: PCT/KR2021/019013
§ 371 (c)(1),
(2) Date: Dec. 12, 2022

(87) PCT Pub. No.: WO2023/090524
PCT Pub. Date: May 25, 2023

(65) Prior Publication Data
US 2024/0100665 A1    Mar. 28, 2024

(30) Foreign Application Priority Data
Nov. 17, 2021   (KR) .......................... 10-2021-0158559

(51) Int. Cl.
*B25B 23/147*   (2006.01)
*B25B 21/00*   (2006.01)

(52) U.S. Cl.
CPC ............ *B25B 21/00* (2013.01); *B25B 23/147* (2013.01)

(58) Field of Classification Search
CPC .............................. B25B 21/00; B25B 23/147
See application file for complete search history.

(56) References Cited

U.S. PATENT DOCUMENTS

| 5,033,552 | A | * | 7/1991 | Hu | ........................... B25B 21/00 |
| | | | | | 241/37.5 |
| 5,224,230 | A | * | 7/1993 | Vanicsek | ............... B25B 21/007 |
| | | | | | 409/230 |
| H1821 | H | * | 12/1999 | Kosinski | ........................... 173/4 |
| 6,170,579 | B1 | * | 1/2001 | Wadge | ...................... B25F 3/00 |
| | | | | | 173/217 |

(Continued)

FOREIGN PATENT DOCUMENTS

| JP | 2010-509078 A | 3/2010 |
| KR | 10-2150745 B1 | 9/2020 |

OTHER PUBLICATIONS

International Search Report for PCT/KR2021/019013 mailed Jul. 20, 2022 from Korean Intellectual Property Office.

(Continued)

*Primary Examiner* — Lucas E. A. Palmer
(74) *Attorney, Agent, or Firm* — Revolution IP, PLLC

(57) ABSTRACT

According to exemplar embodiments of the present invention, a coupling device for replacement of gear box of electric torque wrench comprises a coupling socket (100) including: a socket shaft (110) coupled with a motor rotating shaft of an electric motor mounted on a main body casing (10) of the electric torque wrench; and a socket body (120) mounted on a gear box coupling surface (11) corresponding to a coupled portion with the gear box (20) in the main body casing (10).

5 Claims, 6 Drawing Sheets

(56) References Cited

U.S. PATENT DOCUMENTS

| | | | | |
|---|---|---|---|---|
| 6,176,322 | B1* | 1/2001 | Wadge | B25F 3/00 |
| | | | | 408/4 |
| 6,286,611 | B1* | 9/2001 | Bone | B25F 3/00 |
| | | | | 173/217 |
| 6,550,786 | B2* | 4/2003 | Gifford | B25B 23/0035 |
| | | | | 408/239 R |
| 7,021,399 | B2* | 4/2006 | Driessen | B25F 3/00 |
| | | | | 173/217 |
| 7,743,683 | B2* | 6/2010 | Dayton | B25F 3/00 |
| | | | | 173/217 |
| 7,793,572 | B2* | 9/2010 | Hirt | B25F 3/00 |
| | | | | 81/473 |
| 8,186,555 | B2* | 5/2012 | Shelton, IV | A61B 17/105 |
| | | | | 227/176.1 |
| 9,579,784 | B2* | 2/2017 | Lu | B25F 5/00 |
| 10,994,401 | B2* | 5/2021 | Junkersdorf | B25F 3/00 |
| 11,034,002 | B2* | 6/2021 | Gordon | B25B 23/0028 |
| 2002/0050366 | A1* | 5/2002 | Driessen | B25F 3/00 |
| | | | | 173/217 |
| 2002/0050368 | A1* | 5/2002 | Driessen | B25F 3/00 |
| | | | | 173/217 |
| 2005/0048884 | A1* | 3/2005 | Baker | B23Q 5/045 |
| | | | | 29/560 |
| 2007/0227315 | A1* | 10/2007 | Provost | F16H 1/46 |
| | | | | 81/467 |
| 2010/0032179 | A1* | 2/2010 | Hanspers | B25F 5/00 |
| | | | | 173/11 |
| 2011/0030985 | A1* | 2/2011 | Tsai | B25B 21/02 |
| | | | | 173/217 |
| 2011/0186316 | A1* | 8/2011 | Barhitte | B25F 5/00 |
| | | | | 173/29 |
| 2015/0343583 | A1* | 12/2015 | McRoberts | B23Q 5/045 |
| | | | | 173/213 |
| 2016/0271770 | A1* | 9/2016 | Parwani | B25B 23/08 |
| 2017/0326699 | A1 | 11/2017 | McRoberts et al. | |
| 2022/0193875 | A1* | 6/2022 | Lautenschläger | B25B 21/007 |

OTHER PUBLICATIONS

Bosch power tools launch multi-drill driver with interchangeable adapter, May 12, 2017, EBN, <URL: https://www.ebn.co.kr/news/view/891206>.

* cited by examiner

[FIG. 1]
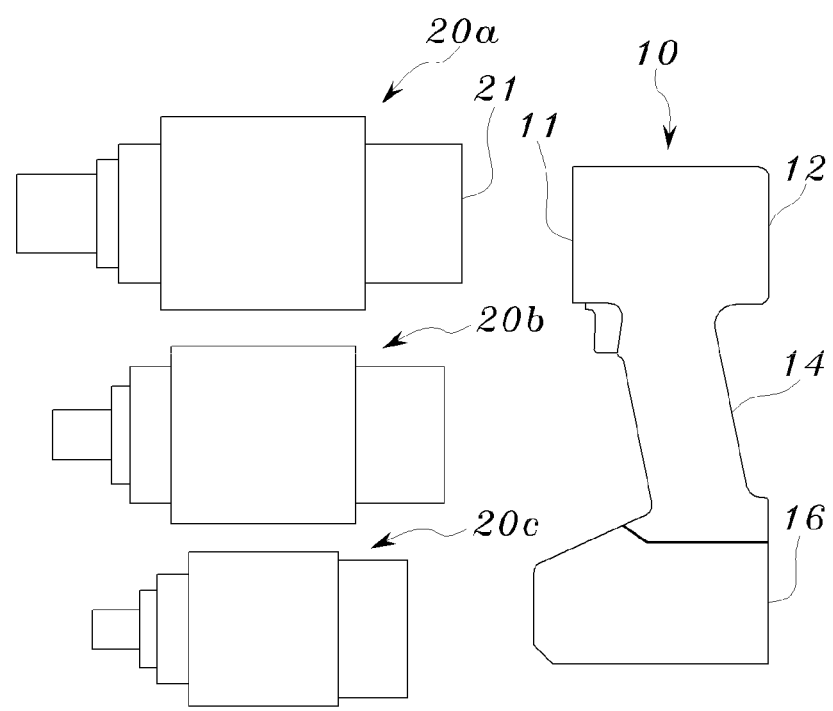

[FIG. 2]
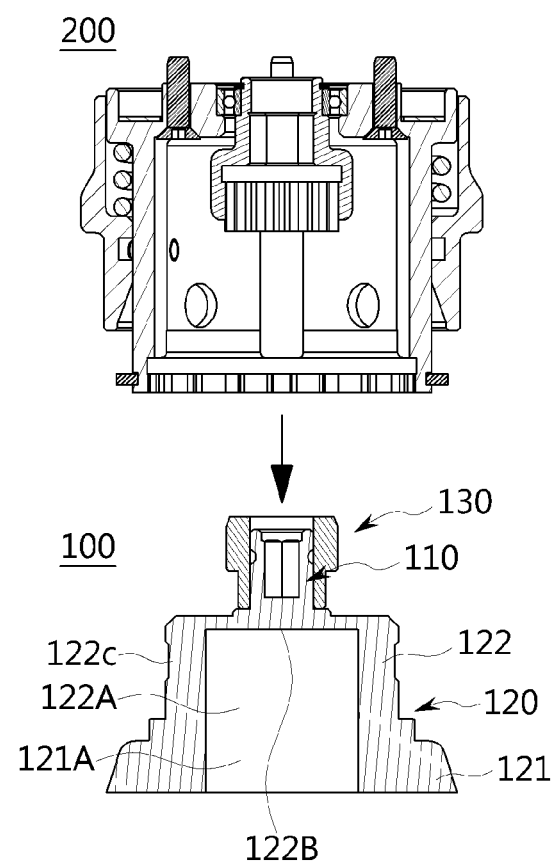

【FIG. 3】
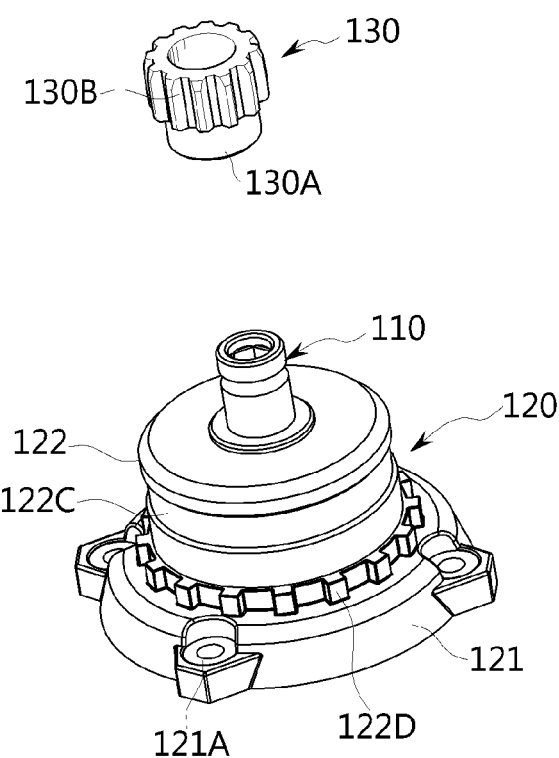

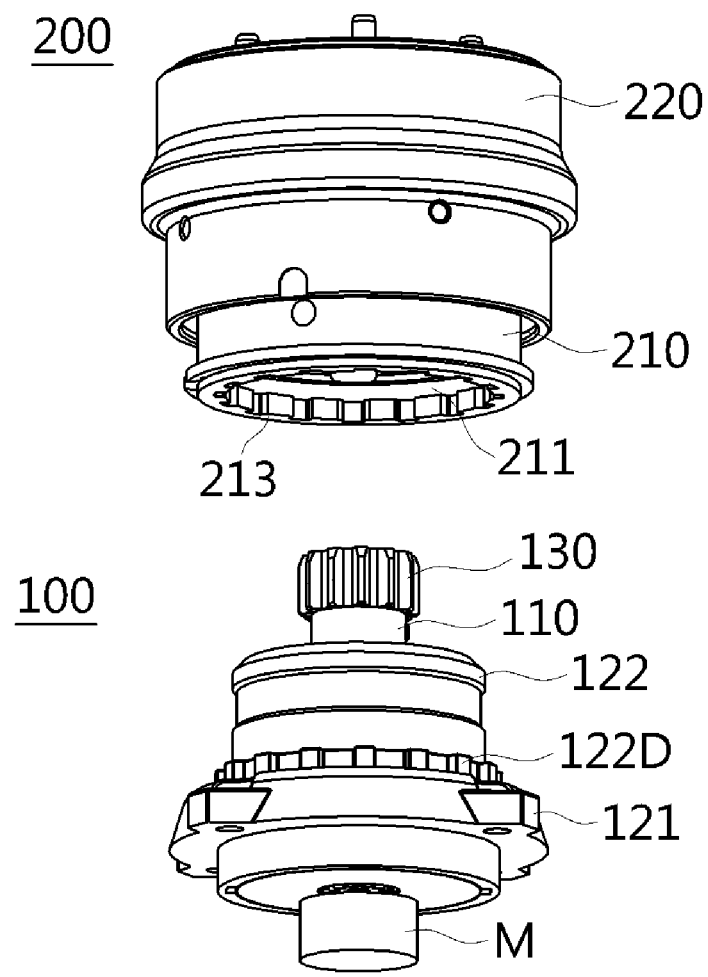
[FIG. 4]

[FIG. 5]
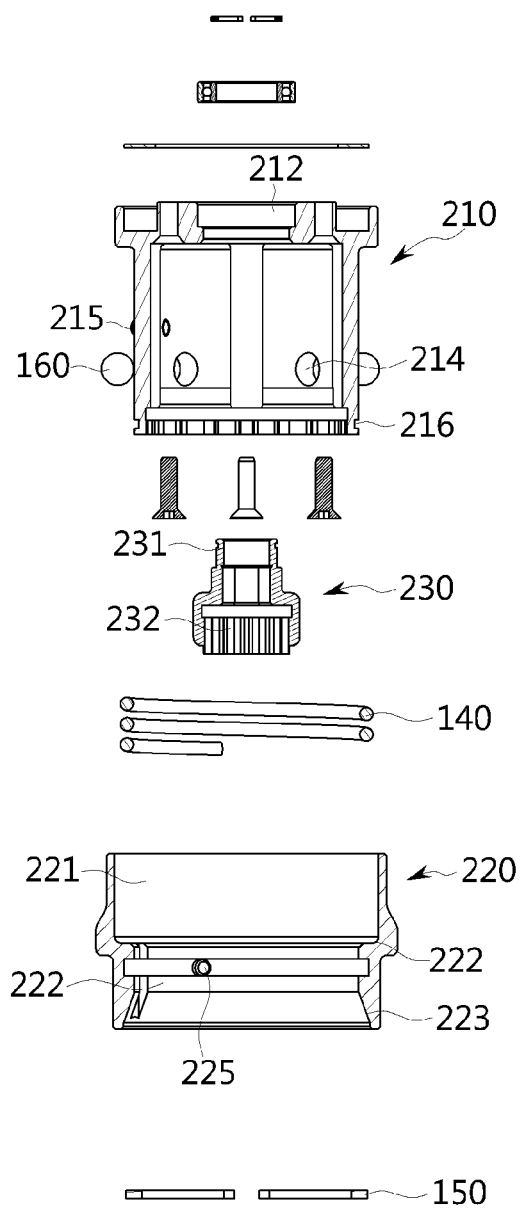

[FIG. 6]
(A)
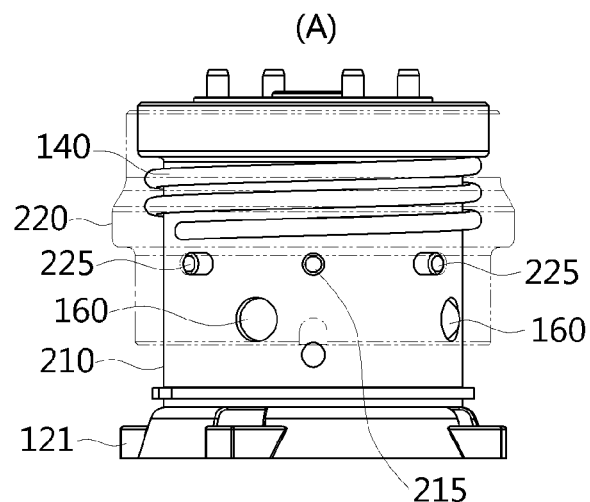
(B)
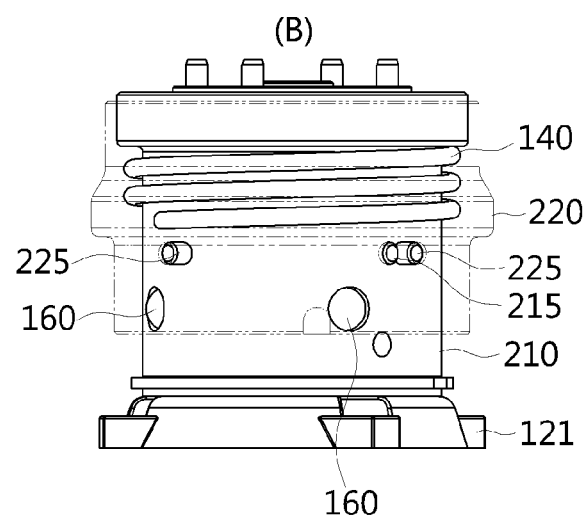

COUPLING DEVICE FOR REPLACEMENT OF GEAR BOX OF ELECTRIC TORQUE WRENCH

TECHNICAL FIELD

The present invention concerns a technology related to an electric torque wrench, and more particularly to a coupling device for replacement of gear box of electric torque wrench (hereinafter may be simply referred to as "gear box replaceable electric torque wrench").

BACKGROUND OF THE INVENTION

A torque wrench is a wrench tool used for fastening a nut to a bolt according to a given torque value. The torque wrench is widely used for bolt fastening in various industrial sites including, but not limited to, power plants, petrochemical factories, building sites, automakers and railroad companies. A bolt fastening work is being implemented under a strict management in industrial sites by setting, as an output torque value, a target torque value for each facility determined by a trial and error over a long time based on standard and theoretical calculations.

Torque wrenches are divided, by classification, hydraulic torque wrenches and electrically driven torque wrenches. The hydraulic torque wrench allows fastening a bolt using a torque corresponding to hydraulics sent from hydraulic pump equipment, and the electrically driven torque wrench allows fastening a bolt using a torque corresponding to a motor driving force generated by an electric motor.

In general, the hydraulic torque wrench is used for a bolt fastening work at large facilities or structures that require a large tightening force. Whereas, the electrically driven torque wrench is advantageous in that it has portability personally hand-carriable by a worker to allow performing a bolt fastening work without work space restrictions.

Furthermore, the hydraulic torque wrench is connected to a hydraulic pump and a wrench equipment simple hose to make it difficult to change a real time of output torque value. This is because there is a time delay up to an output torque value being actually changed, even if supplied hydraulics is changed.

Meantime, the electrically driven torque wrench is advantageous in that an output torque value can be changed in real time because operation of electric motor can be controlled in real time by an electric signal.

In general, an electrically driven torque wrench is formed with a main body casing including: a main body part mounted at an inner accommodation space with an electric motor and a motor driver; a handle part extended downward of the main body; and a battery part coupled at a bottom surface direction of the handle part.

Furthermore, the electrically driven torque wrench has a gear box that is dynamically coupled at a front side of the main body part with a motor rotating shaft of an electric motor and transmits an output generated from the driving of the electric motor to a tightening member by increasing or decreasing the output.

However, a product of an electrically driven torque wrench according to the conventional technology is manufactured and marketed while a main body casing and a gear box are integrally coupled. That is, a single product of electrically driven torque wrench is manufactured and marketed with a gear box only in an integrally coupled shape having a specific single reduction ratio.

In case where a reduction ratio required for bolting work at each industrial site or facility is different, a troublesome problem arises in terms of big burden of cost because products of several types of electrically driven torque wrenches having different reduction ratios must be respectively purchased.

In addition, there is also a disadvantageous discomfort in the aspect of a worker that several types of electrically driven torque wrenches must be simultaneously hand-carried.

DETAILED DESCRIPTION OF THE INVENTION

Technical Subject

The present invention is provided solve the aforementioned disadvantages and it is an object of the present invention to provide a coupling device for replacement of gear box of electric torque wrench configured to replace a gear box in a manner of attachable to and detachable from a main body casing while commonly using a main body casing of the electric torque wrench.

Technical Solution

In one general aspect of the present invention, there may be provided a coupling device for replacement of gear box of electric torque wrench, the coupling device comprising a coupling socket (100) including: a socket shaft (110) coupled with a motor rotating shaft of an electric motor mounted on a main body casing (10) of the electric torque wrench; and a socket body (120) mounted on a gear box coupling surface (11) corresponding to a coupled portion with the gear box (20) in the main body casing (10). Furthermore, the coupling device for replacement of gear box of electric torque wrench may comprise a coupling adapter (200) attachably and detachably coupled to the coupling socket by being mounted on a main body coupling surface (21) corresponding to a coupled portion with the main body casing (10) in the gear box (20).

Advantageous Effects of the Invention

The coupling device according to an exemplary embodiment of the present invention has an advantageous effect in that a coupling device for replacement of gear box of electric torque wrench can be embodied by replacing a gear box in a manner of attachable to and detachable from a main body casing while commonly using a main body casing of the electric torque wrench.

BRIEF DESCRIPTION OF DRAWINGS

FIG. 1 is a schematic view to explain a coupling device for replacement of gear box of electric torque wrench according to an exemplary embodiment of the present invention.

FIGS. 2 to 6 are schematic views to explain a coupling device for replacement of gear box of electric torque wrench according to an exemplary embodiment of the present invention.

DETAILED DESCRIPTION

The present invention may have various exemplary embodiments while being applied with various changes, and is intended to exemplify specific exemplary embodiments with reference to drawings and to explain in detail the exemplary embodiments in the Detailed Description. However, it should be appreciated that the present invention does not limit the scope of protection of the present invention to specific exemplary embodiments, and numerous other changes, equivalents, modifications and embodiments can be devised that will fall within the spirit and scope of the principles of this invention.

Throughout the specification, it will be understood that when an element is referred to as being "connected", "contacted" or "coupled" to another element, it can be directly connected, contacted or coupled to the other elements, or otherwise, an intervening elements may be "connected", "contacted" or "coupled" between the element and the other element unless otherwise specified. Furthermore, throughout the specification, it will be understood that when one element "includes", "including," "has" and/or "having" another elements, the terms "includes", "including," "has" and/or "having" are inclusive and therefore specify the presence of elements, and/or components, but do not preclude the presence but rather may include addition of one or more other elements and/or components unless otherwise specified. Hereinafter, exemplary embodiments of the present invention will be described in detail with reference to the accompanying drawings.

Referring to FIG. 1, a gear box replaceable electric torque wrench according to an exemplary embodiment of the present invention may comprise: a main body casing (10) including a main body part (12) mounted at an inner accommodation space with an electric motor and a motor driver, a handle part (14) extended downward of the main body part, and a detachable battery part (16) coupled to a bottom surface direction of the handle part (14); and a gear box (reference numerals 20a, 20b, 20c in FIG. 1, hereinafter representatively referred to as reference numeral 20) dynamically coupled at a front side of the main body part (12) to a motor rotating shaft of the electric motor and transmits an output generated from the driving of the electric motor to a tightening member by increasing or decreasing the output.

Accordingly, by using a coupling device (to be described later), the gear box replaceable electric torque wrench according to an exemplary embodiment of the present invention can be used by replacing gear boxes (reference numerals 20a, 20b, 20c in FIG. 1) having various different reduction ratios while keeping a commonly used main body casing (10) as it is.

That is, a gear box coupling surface (11) at a front side of the main box part (12) in the gear box replaceable electric torque wrench may be installed with a coupling socket (100) of a coupling device (described later), and a coupling adapter (200) of the coupling device (described later) may be installed on a main body coupling surface (21) at a rear side of each gear box (20a, 20b, 20c of FIG. 1, representatively as 20) each having various different reduction ratios, as mentioned before. At this time, attachment and detachment between the coupling socket (100) and the coupling adapter (200) may enable attachment and detachment between the common main body casing (10) of electric torque wrench and the gear box (20).

Hereinafter, referring to FIGS. 2~6, detailed configurations of the coupling socket (100) and the coupling adapter (200) respectively forming the coupling device, and attachment and detachment coupling method therebetween will be described in detail.

The coupling device used for realizing the gear box replaceable electric torque wrench according to an exemplary embodiment of the present invention may comprise a coupling socket (100) including a socket shaft (110) coupled with a motor rotating shaft of an electric motor mounted on a main body casing (10) of the electric torque wrench; and a socket body (120) mounted on a gear box coupling surface (11) corresponding to a coupled portion with the gear box (20) in the main body casing (10)(See FIGS. 2 and 3).

Furthermore, the coupling device used for realizing the gear box replaceable electric torque wrench according to an exemplary embodiment of the present invention may comprise a coupling adapter (200) attachably and detachably coupled to the coupling socket by being mounted on a main body coupling surface (21) corresponding to a coupled portion with the main body casing (10) in the gear box (20) (See FIG. 2).

The socket body (120) in the exemplary embodiment of the present invention may be integrally manufactured by including a base plate part (121) forming a bottom surface of the socket body and a cylindrical body part (122) forming an upper surface of the socket body.

At this time, the base plate part (121) may be so manufactured as to cover the gear box coupling surface (11) matching to an outer shape of the gear box coupling surface (11), and provided at a center part of plate bottom surface with an inner circumferential cavity (121A), and may include a plurality of bolting coupling holes (121B) at an outer side of the plate for bolted fixing with the gear box coupling surface (11).

At this time, the cylindrical body part (122) may be protrusively formed toward an upper direction of the base plate part (121) while having a diameter smaller than that of the base plate part (121), have an inner circumferential cavity (122A) having a same sized diameter as that of the inner circumferential cavity (121A) while communicating with of the inner circumferential cavity (121A) provided on the base plate part (121), include a through hole (122B) to allow the socket shaft (110) to be installed therethrough while being provided at an upper center part to communicate with the inner circumferential cavity, include a ball bearing accommodation rail (122C) having a predetermined width depressed toward an inner side along an upper perimeter, and include a plurality of first spline taps (122D) provided in an equidistance along a bottom perimeter of the cylindrical body part (122) at a connected portion between the base plate part (121) and the cylindrical body part (122).

In this case, a motor rotating shaft (M) of the electric motor may be shaft-coupled with the socket shaft (110) via a predetermined shaft connecting means {not shown, that is, a connecting means for power transfer between the motor rotating shaft (M) and socket shaft (110)} depressively installed at the inner circumferential cavities (121A, 122A) respectively provided at the base plate part (121) and the cylindrical body part (122) (See FIG. 4).

Furthermore, the coupling socket (100) in the exemplary embodiment of the present invention may further include a cylindrical coupling shaft (130) shaft-coupled with the motor rotating shaft and the socket shaft by being mounted on the socket shaft (110) to wrap a perimeter of the socket shaft (110) through an inner circumferential cavity (130A), and provided with a plurality of crowning gear type teeth (130B) along an upper perimeter (See FIG. 3).

In addition, the coupling adapter (200) may include a first cylindrical member (210), a second cylindrical member (220) and a coupling hub (230) (FIGS. 4 and 5).

At this time, the first cylindrical member (210) may include a through hole (212) having an inner circumferential cavity (211) extensively formed from a bottom surface to an upper direction and provided on an upper surface by being communicated with the inner circumferential cavity (211), include a plurality of second spline taps (213) provided at an inner bottom side to have a shape corresponding to that of the plurality of the first spline taps (122D) to be coupled with the plurality of first spline taps (122D) provided on the cylindrical body part (122), and at least one ball bearing accommodation hole (214) provided with a ring guide groove (216) at an installation position of a snap ring (150) along a bottom perimeter corresponding to a position formed with the second spline tap (213) and provided at an outer predetermined position.

At this time, the second cylindrical member (220) may include an upper inner circumferential cavity (221) and a lower inner circumferential cavity (222) that provide a space for the first cylindrical member (210) to be inserted therein, and an accommodation guide (222) forming a boundary of the upper inner circumferential cavity (221) and the lower inner circumferential cavity (222), and providing an accommodation space of an elastic spring (140) so installed as to wrap a perimeter of the first cylindrical member (210) at a discrete space between an outer circumferential surface of the first cylindrical member (210) and an inner circumferential surface of the second cylindrical member (220) when the first cylindrical member (210) is inserted by being protrusively formed to an inner side direction along an inner circumferential surface, wherein an inner wall (223), formed at a portion corresponding to a formed position of the ball bearing accommodation hole (214) when the first cylindrical member (210) is inserted at a lower inner circumferential surface, may be formed with a slope that increases a diameter of the inner circumferential surface toward a bottom surface.

At this time, the coupling hub (230) may include a hub shaft (231) coupled with a gear shaft of the gear box (20) that is mounted on a through hole (212) provided at an upper surface of the first cylindrical member (210) and that has an outer circumferential diameter smaller than that of the through hole (212), and may include teeth (232) so provided at an inner bottom side as to have a shape corresponding to that of the teeth (130B) to allow being coupled with the teeth (130B) provided at an upper side of the coupling shaft (130).

According to the foregoing configuration, when the coupling socket (100) and the coupling adapter (200) are initially coupled by a method where the coupling hub (230) is coupled with the coupling shaft (130), and the second spline tap (213) provided at the first cylindrical member (210) is coupled with the first spline tap (122D) provided at the coupling socket (100), the ball bearing (160) accommodated into the ball bearing accommodation hole (214) of the first cylindrical member (210) may be arranged adjacent to a formed position of the ball bearing accommodation rail (122C) of the coupling socket (100).

In the said initial coupled state, a fixed coupling between the coupling socket (100) and the coupling adapter (200) may be realized by allowing being accommodated on the ball bearing accommodation rail (122C) according to descent of an inner wall (223) of the second cylindrical member (220) when the second cylindrical member (220) is pulled toward a direction where the coupling socket (100) is positioned {See FIG. 6(A)}.

Furthermore, in the exemplary embodiment of the present invention, at least one locking pin (215) may be protrusively formed at a predetermined perimeter of the first cylindrical member (210) toward an outer direction, and at least one second locking pin (225) may be also protrusively formed toward an inner direction at a predetermined position of an inner perimeter of the second cylindrical member (220). According to the said foregoing configuration, when the coupling socket and the coupling adapter are fixedly coupled, the first locking pin (215) and the second locking pin (225) may be arranged at mutually different positions of same height based on the coupling adapter.

At this time, when the second locking pin (225) abuts the first locking pin (215) by a method where the second cylindrical member (220) is relatively rotated with reference to the first cylindrical member (210), the first locking pin (225) may serve to perform a role of a rotating locking stopper to allow a locked coupling between the coupling socket and the coupling adapter {See FIG. 6(B)}.

Although the abovementioned embodiments according to the present invention have been described and illustrated in detail with reference to the above specific examples, it should be appreciated by the skilled in the art that changes, modifications and amendments to the above examples may be made without deviating from the scope of protection of the invention.

The invention claimed is:

1. A coupling device for replacement of gear box of electric torque wrench, the coupling device comprising a coupling socket (100) including: a socket shaft (110) coupled with a motor rotating shaft of an electric motor mounted on a main body casing (10) of the electric torque wrench;
   a socket body (120) mounted on a gear box coupling surface (11) corresponding to a coupled portion with the gear box (20) in the main body casing (10); and
   a coupling adapter (200) attachably and detachably coupled to the coupling socket by being mounted on a main body coupling surface (21) corresponding to a coupled portion with the main body casing (10) in the gear box (20),
   wherein the socket body (120) is integrally manufactured by including a base plate part (121) forming a bottom surface of the socket body and a cylindrical body part (122) forming an upper surface of the socket body,
   the base plate part (121) is so manufactured as to cover the gear box coupling surface (11) matching to an outer shape of the gear box coupling surface (11), and provided at a center part of plate bottom surface with an inner circumferential cavity (121A), and includes a plurality of bolting coupling holes (121B) at an outer side of the plate for bolted fixing with the gear box coupling surface (11), and
   the cylindrical body part (122) is protrusively formed toward an upper direction of the base plate part (121) while having a diameter smaller than that of the base plate part (121), has an inner circumferential cavity (122A) having a same sized diameter as that of the inner circumferential cavity (121A) while communicating with of the inner circumferential cavity (121A) provided on the base plate part (121), includes a through hole (122B) to allow the socket shaft (110) to be installed therethrough while being provided at an upper center part to communicate with the inner circumferential cavity, includes a ball bearing accommodation rail (122C) having a predetermined width depressed toward an inner side along an upper perimeter, and includes a plurality of first spline taps (122D) provided in an equidistance along a bottom perimeter of the cylindrical body part (122) at a connected portion between the base plate part (121) and the cylindrical body part (122).

2. The coupling device of claim 1, wherein the coupling socket (100) further includes a cylindrical coupling shaft (130) shaft-coupled with the motor rotating shaft and the socket shaft by being mounted on the socket shaft (110) to wrap a perimeter of the socket shaft (110) through an inner circumferential cavity (130A), and provided with a plurality of crowning gear type teeth (130B) along an upper perimeter.

3. The coupling device of claim 2, wherein the coupling adapter (200) includes a first cylindrical member (210), a second cylindrical member (220) and a coupling hub (230), wherein the first cylindrical member (210) includes a through hole (212) having an inner circumferential cavity (211) extensively formed from a bottom surface to an upper direction and provided on an upper surface by being communicated with the inner circumferential cavity (211), includes a plurality of second spline taps (213) provided at an inner bottom side to have a shape corresponding to that of the plurality of the first spline taps (122D) to be coupled with the plurality of first spline taps (122D) provided on the cylindrical body part (122), and at least one ball bearing accommodation hole (214) provided with a ring guide groove (216) at an installation position of a snap ring (150) along a bottom perimeter corresponding to a position formed with the second spline tap (213) and provided at an outer predetermined position, the second cylindrical member (220) includes an upper inner circumferential cavity (221) and a lower inner circumferential cavity (222) that provide a space for the first cylindrical member (210) to be inserted therein, and an accommodation guide (222) forming a boundary of the upper inner circumferential cavity (221) and the lower inner circumferential cavity (222), and providing an accommodation space of an elastic spring (140) so installed as to wrap a perimeter of the first cylindrical member (210) at a discrete space between an outer circumferential surface of the first cylindrical member (210) and an inner circumferential surface of the second cylindrical member (220) when the first cylindrical member (210) is inserted by being protrusively formed to an inner side direction along an inner circumferential surface, and wherein an inner wall (223), formed at a portion corresponding to a formed position of the ball bearing accommodation hole (214) when the first cylindrical member (210) is inserted at a lower inner circumferential surface, is formed with a slope that increases a diameter of the inner circumferential surface toward a bottom surface, and the coupling hub (230) includes a hub shaft (231) coupled with a gear shaft of the gear box (20) that is mounted on a through hole (212) provided at an upper surface of the first cylindrical member (210) and that has an outer circumferential diameter smaller than that of the through hole (212), and may include teeth (232) so provided at an inner bottom side as to have a shape corresponding to that of the teeth (130B) to allow being coupled with the teeth (130B) provided at an upper side of the coupling shaft (130).

4. The coupling device of claim 3, wherein, when the coupling socket (100) and the coupling adapter (200) are initially coupled by a method where the coupling hub (230) is coupled with the coupling shaft (130), and the second spline tap (213) provided at the first cylindrical member (210) is coupled with the first spline tap (122D) provided at the coupling socket (100), the ball bearing (160) accommodated into the ball bearing accommodation hole (214) of the first cylindrical member (210) may be arranged adjacent to a formed position of the ball bearing accommodation rail (122C) of the coupling socket (100), wherein a fixed coupling between the coupling socket (100) and the coupling adapter (200) is realized by allowing being accommodated on the ball bearing accommodation rail (122C) according to descent of an inner wall (223) of the second cylindrical member (220) when the second cylindrical member (220) is pulled toward a direction where the coupling socket (100) is positioned.

5. The coupling device of claim 4, wherein at least one locking pin (215) is protrusively formed at a predetermined perimeter of the first cylindrical member (210) toward an outer direction, and at least one second locking pin (225) is also protrusively formed toward an inner direction at a predetermined position of an inner perimeter of the second cylindrical member (220), and wherein the first locking pin (215) and the second locking pin (225) are arranged at mutually different positions of same height based on the coupling adapter, when the coupling socket and the coupling adapter are fixedly coupled, and wherein, the first locking pin (225) serves to perform a role of a rotating locking stopper to allow a locked coupling between the coupling socket and the coupling adapter, when the second locking pin (225) abuts the first locking pin (215) by a method where the second cylindrical member (220) is relatively rotated with reference to the first cylindrical member (210).

* * * * *